US010156160B2

(12) United States Patent
Lajtner et al.

(10) Patent No.: US 10,156,160 B2
(45) Date of Patent: Dec. 18, 2018

(54) SYSTEMS AND METHODS TO CONTROL POWER PLANT OPERATION VIA CONTROL OF TURBINE RUN-UP AND ACCELERATION

(71) Applicant: General Electric Technology GmbH, Baden (CH)

(72) Inventors: Marko Lajtner, Baden (CH); Anand Nagasayanam, Wettingen (CH); Nikolaus Schuermann, Bern (CH)

(73) Assignee: General Electric Technology GMBH, Baden (CH)

( * ) Notice: Subject to any disclaimer, the term of this patent is extended or adjusted under 35 U.S.C. 154(b) by 229 days.

(21) Appl. No.: 15/332,311

(22) Filed: Oct. 24, 2016

(65) Prior Publication Data

US 2018/0112561 A1   Apr. 26, 2018

(51) Int. Cl.
*F01K 13/02* (2006.01)
*F01D 19/00* (2006.01)
(Continued)

(52) U.S. Cl.
CPC ............. *F01K 13/02* (2013.01); *F01D 19/00* (2013.01); *F01K 7/12* (2013.01); *F01K 7/14* (2013.01);
(Continued)

(58) Field of Classification Search
CPC . F01K 13/02; F01K 9/00; F01K 9/023; F01K 7/10; F01K 7/12; F01K 7/14;
(Continued)

(56) References Cited

U.S. PATENT DOCUMENTS

| 4,204,258 A | * | 5/1980 | Zitelli | F01D 17/24 |
| | | | | 290/40 A |
| 2004/0128035 A1 | * | 7/2004 | Vandervort | F01K 7/165 |
| | | | | 700/287 |

(Continued)

FOREIGN PATENT DOCUMENTS

| JP | 58167812 A | * | 10/1983 | ............. F01K 23/10 |
| JP | 60224980 A | * | 11/1985 | ............... F01K 9/02 |

*Primary Examiner* — Mark Laurenzi
*Assistant Examiner* — Xiaoting Hu
(74) *Attorney, Agent, or Firm* — Eversheds Sutherland (US) LLP

(57) ABSTRACT

Systems and methods to control power plant operation via control of turbine run-up and acceleration are disclosed. According to one embodiment of the disclosure, a method of controlling a turbine in a power plant can be provided. The method may include receiving an operating pressure of a condenser associated with a power plant; receiving a rotor speed of a turbine associated with the power plant; receiving a last stage blade (LSB) protection limit for the turbine; based at least in part on the operating pressure of the condenser, the rotor speed of the turbine, and the LSB protection limit, allowing, via a control system, a run-up of the turbine. The method may further include: receiving a rotor speed gradient of the turbine; receiving one or more critical speed ranges associated with the rotor speed of the turbine; and based at least in part on the operating pressure of the condenser, the rotor speed, the rotor speed gradient, and the one or more critical speed ranges, regulating, via the control system, at least one of: the rotor speed of the turbine and the rotor speed gradient of the turbine.

20 Claims, 9 Drawing Sheets

(51) Int. Cl.
- *F01K 7/12* (2006.01)
- *F01K 7/14* (2006.01)
- *F01K 7/16* (2006.01)
- *F01K 9/00* (2006.01)
- *F01K 9/02* (2006.01)
- *F01K 15/00* (2006.01)
- *H02K 7/18* (2006.01)
- *F01K 7/38* (2006.01)

(52) U.S. Cl.
CPC ............... *F01K 7/16* (2013.01); *F01K 7/165* (2013.01); *F01K 7/38* (2013.01); *F01K 9/00* (2013.01); *F01K 9/023* (2013.01); *F01K 15/00* (2013.01); *H02K 7/1823* (2013.01)

(58) Field of Classification Search
CPC . F01K 7/16; F01K 7/165; F01K 15/00; F01D 19/00; F01D 25/04; F01D 25/06
See application file for complete search history.

(56) References Cited

U.S. PATENT DOCUMENTS

| | | | |
|---|---|---|---|
| 2011/0158786 A1* | 6/2011 | Molitor | F01K 13/02 415/1 |
| 2016/0169054 A1* | 6/2016 | Tsukuda | F01K 13/003 60/657 |

* cited by examiner

SYSTEMS AND METHODS TO CONTROL POWER PLANT OPERATION VIA CONTROL OF TURBINE RUN-UP AND ACCELERATION

TECHNICAL FIELD

Embodiments of this disclosure generally relate to power plants, and more specifically, to systems and methods to control power plant operation via control of turbine run-up and acceleration.

BACKGROUND

A power plant can include one or more turbines, such as, for example, a steam turbine. A steam turbine can be connected to a generator that can transmit power from the steam turbine to a grid. The steam turbine can exhaust steam to a condenser at an operating pressure typically referred to as condenser pressure. Condenser pressure can typically be kept under vacuum to achieve good steam turbine efficiency.

A controller associated with the power plant can manage turbine operation to ensure that the turbine can operate within limits based on its hardware design. A last stage blade design of the turbine can limit start-up and operation of the turbine based on the condenser pressure.

BRIEF DESCRIPTION OF THE DISCLOSURE

Some or all of the above needs and/or problems may be addressed by certain embodiments of the disclosure. Certain embodiments may include systems and methods to control power plant operation via control of turbine run-up and acceleration. According to one embodiment of the disclosure, a method of controlling a turbine in a power plant can be provided. The method may include receiving an operating pressure of a condenser associated with a power plant; receiving a rotor speed of a turbine associated with the power plant; receiving a last stage blade (LSB) protection limit for the turbine; based at least in part on the operating pressure of the condenser, the rotor speed of the turbine, and the LSB protection limit, allowing, via a control system, a run-up of the turbine. The method may further include: receiving a rotor speed gradient of the turbine; receiving one or more critical speed ranges associated with the rotor speed of the turbine; and based at least in part on the operating pressure of the condenser, the rotor speed, the rotor speed gradient, and the one or more critical speed ranges, regulating, via the control system, at least one of: the rotor speed of the turbine and the rotor speed gradient of the turbine.

According to another embodiment of the disclosure, a system can be provided. The system may include a power plant and a turbine associated with the power plant. The system can also include a controller in communication with the turbine. The system can also include a memory with instructions executable by a computer for performing operations that can include: receiving an operating pressure of a condenser associated with the power plant; receiving a rotor speed of the turbine; receiving a last stage blade (LSB) protection limit for the turbine; based at least in part on the operating pressure of the condenser, the rotor speed of the turbine, and the LSB protection limit, allowing a run-up of the turbine; receiving a rotor speed gradient of the turbine; receiving one or more critical speed ranges associated with the rotor speed of the turbine; and based at least in part on the operating pressure of the condenser, the rotor speed, the rotor speed gradient, and the one or more critical speed ranges, regulating at least one of: the rotor speed of the turbine and the rotor speed gradient of the turbine.

According to another embodiment of the disclosure, a non-transitory computer-readable medium can be provided. The non-transitory computer-readable medium can include instructions executable by a computer for performing operations that can include, receiving an operating pressure of a condenser associated with a power plant; receiving a rotor speed of a turbine associated with the power plant; receiving a last stage blade (LSB) protection limit for the turbine; based at least in part on the operating pressure of the condenser, the rotor speed of the turbine, and the LSB protection limit, allowing, via a control system, a run-up of the turbine; receiving a rotor speed gradient of the turbine; receiving one or more critical speed ranges associated with the rotor speed of the turbine; and based at least in part on the operating pressure of the condenser, the rotor speed, the rotor speed gradient, and the one or more critical speed ranges, regulating, via the control system, at least one of: the rotor speed of the turbine and the rotor speed gradient of the turbine.

Other embodiments, features, and aspects of the disclosure will become apparent from the following description taken in conjunction with the following drawings.

BRIEF DESCRIPTION OF THE DRAWINGS

Figure 1:
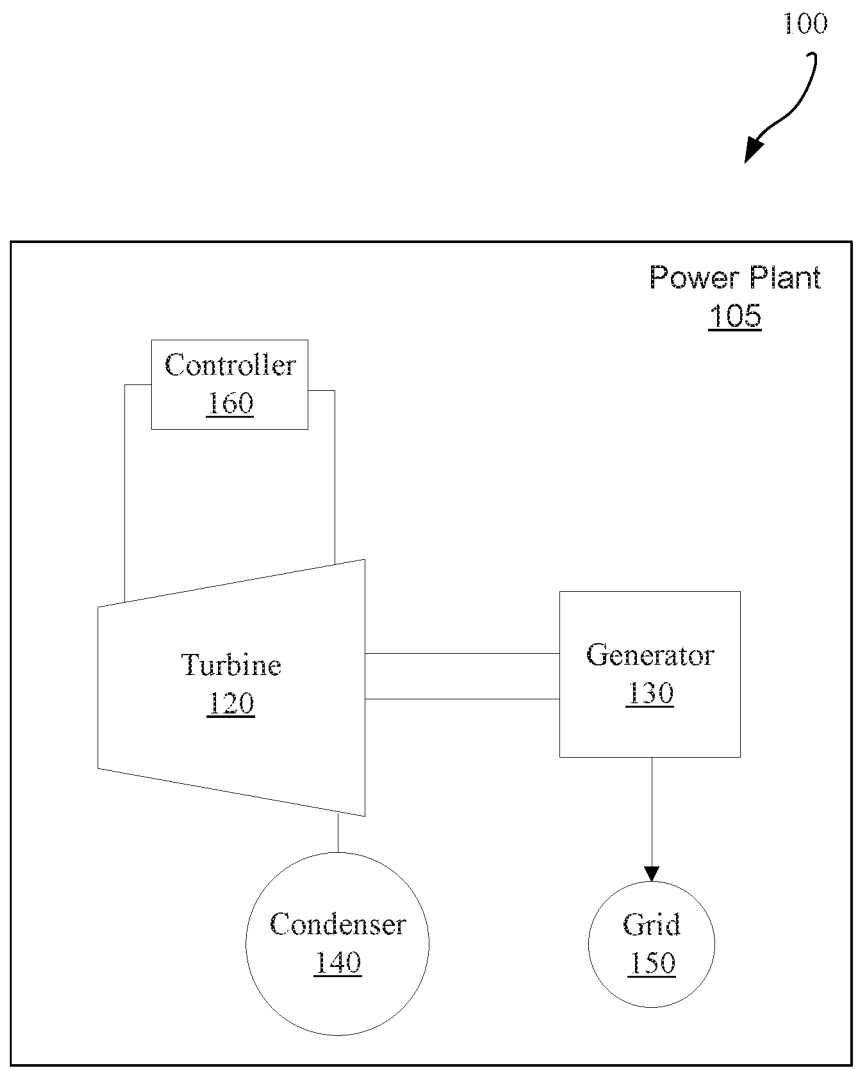

Having thus described the disclosure in general terms, reference will now be made to the accompanying drawings, which are not necessarily drawn to scale, and wherein:

FIG. 1 is a block diagram illustrating an example environment in which certain systems and methods to control power plant operation via control of turbine run-up and acceleration can be implemented, according to an example embodiment of the disclosure.

Figure 2:
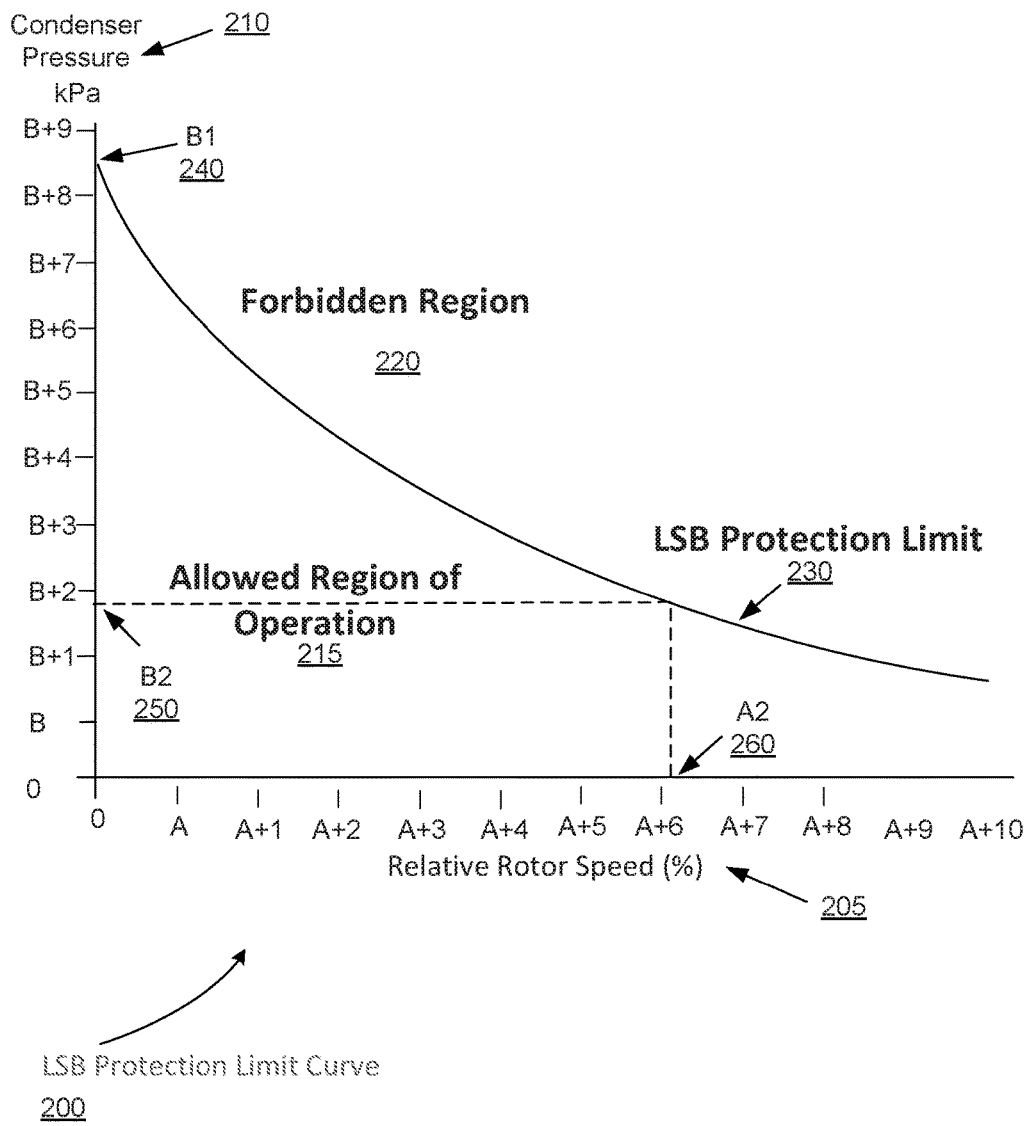

FIG. 2 illustrates an example LSB protection limit curve for an example implementation of systems and methods to control power plant operation via control of turbine run-up and acceleration, according to an example embodiment of the disclosure.

Figure 3:
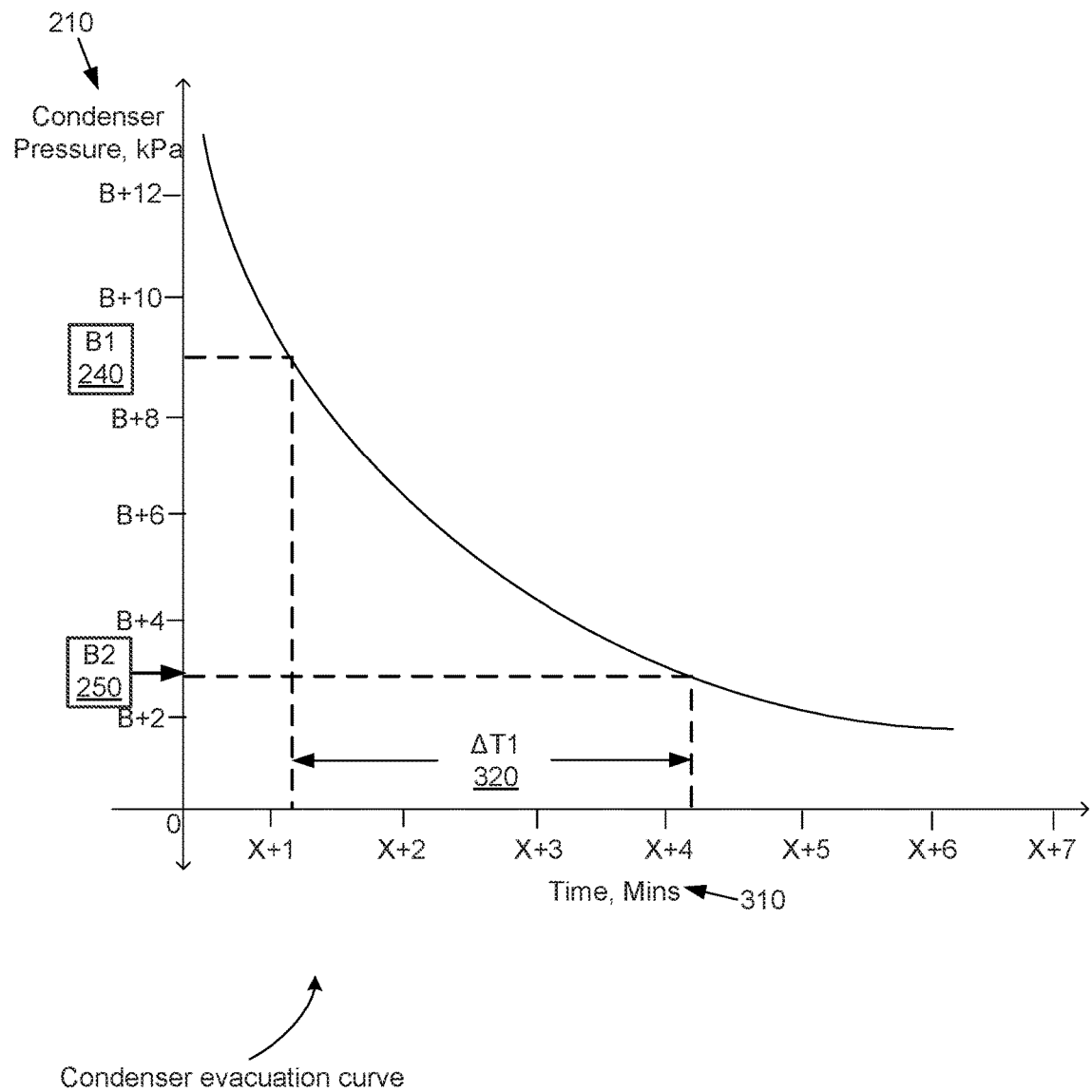

FIG. 3 illustrates an example condenser evacuation curve in an example implementation of systems and methods to control power plant operation via control of turbine run-up and acceleration, according to an example embodiment of the disclosure.

Figure 4:
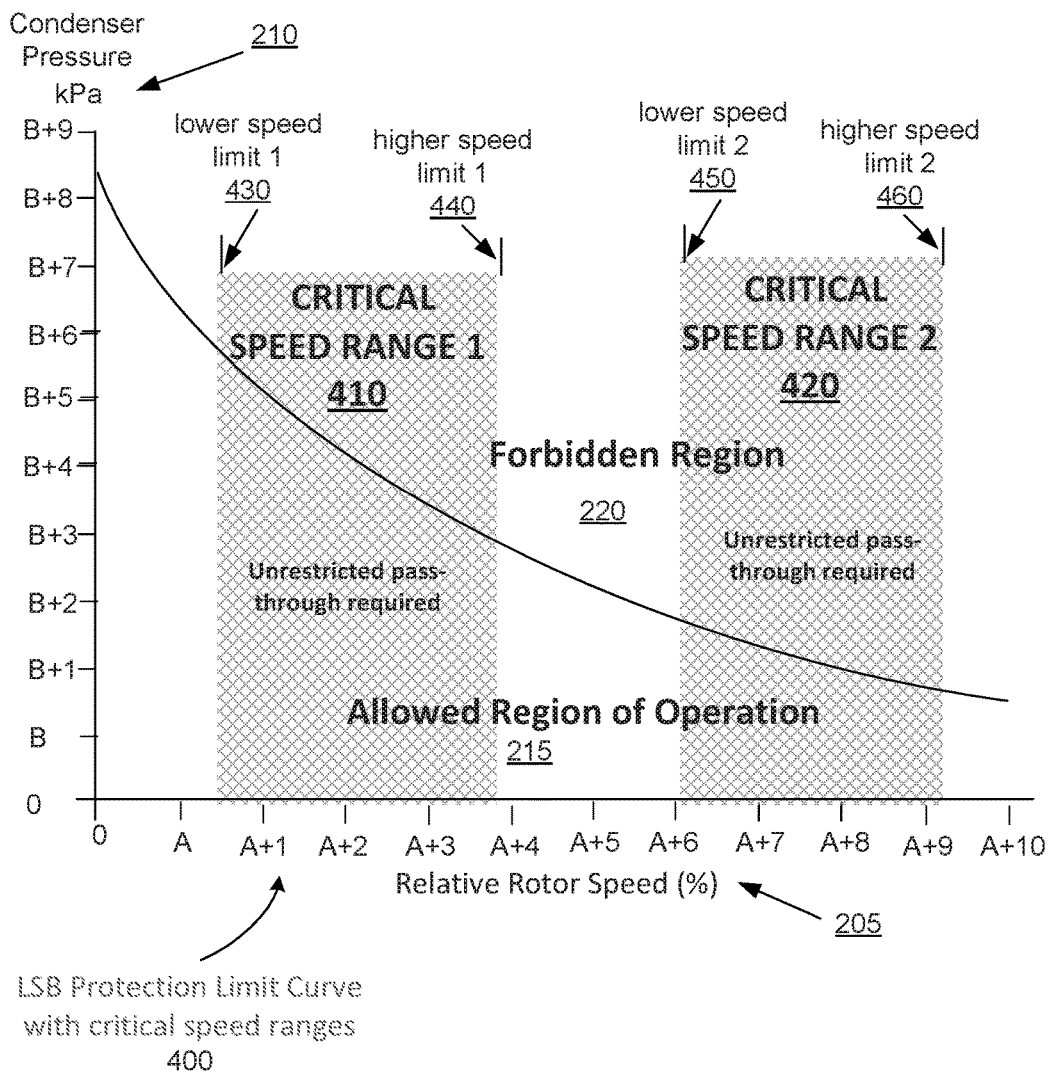

FIG. 4 illustrates an example LSB protection limit curve with critical speed ranges in an example implementation of systems and methods to control power plant operation via control of turbine run-up and acceleration, according to an example embodiment of the disclosure.

FIG. 5 (a) illustrates an example condenser evacuation curve superimposed with rotor speed curves and FIG. 5 (b) illustrates an example LSB protection limit curve with a superimposed critical speed range in an example implementation of systems and methods to control power plant operation via control of turbine run-up and acceleration, according to an example embodiment of the disclosure.

Figure 6:
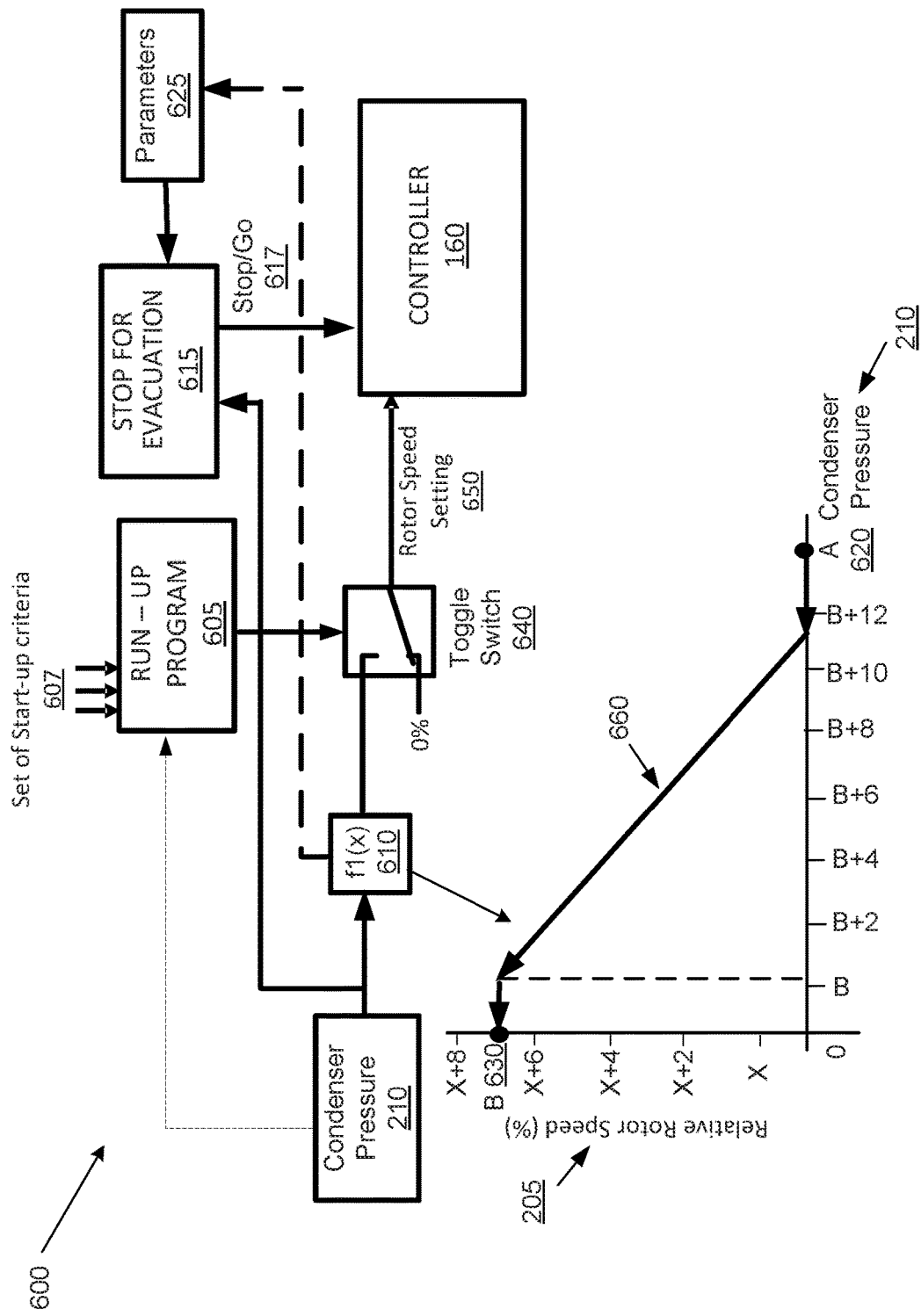

FIG. 6 depicts an example control logic diagram illustrating an example environment in which certain systems and methods to control power plant operation via control of turbine run-up and acceleration can be implemented, according to an example embodiment of the disclosure.

Figure 7:
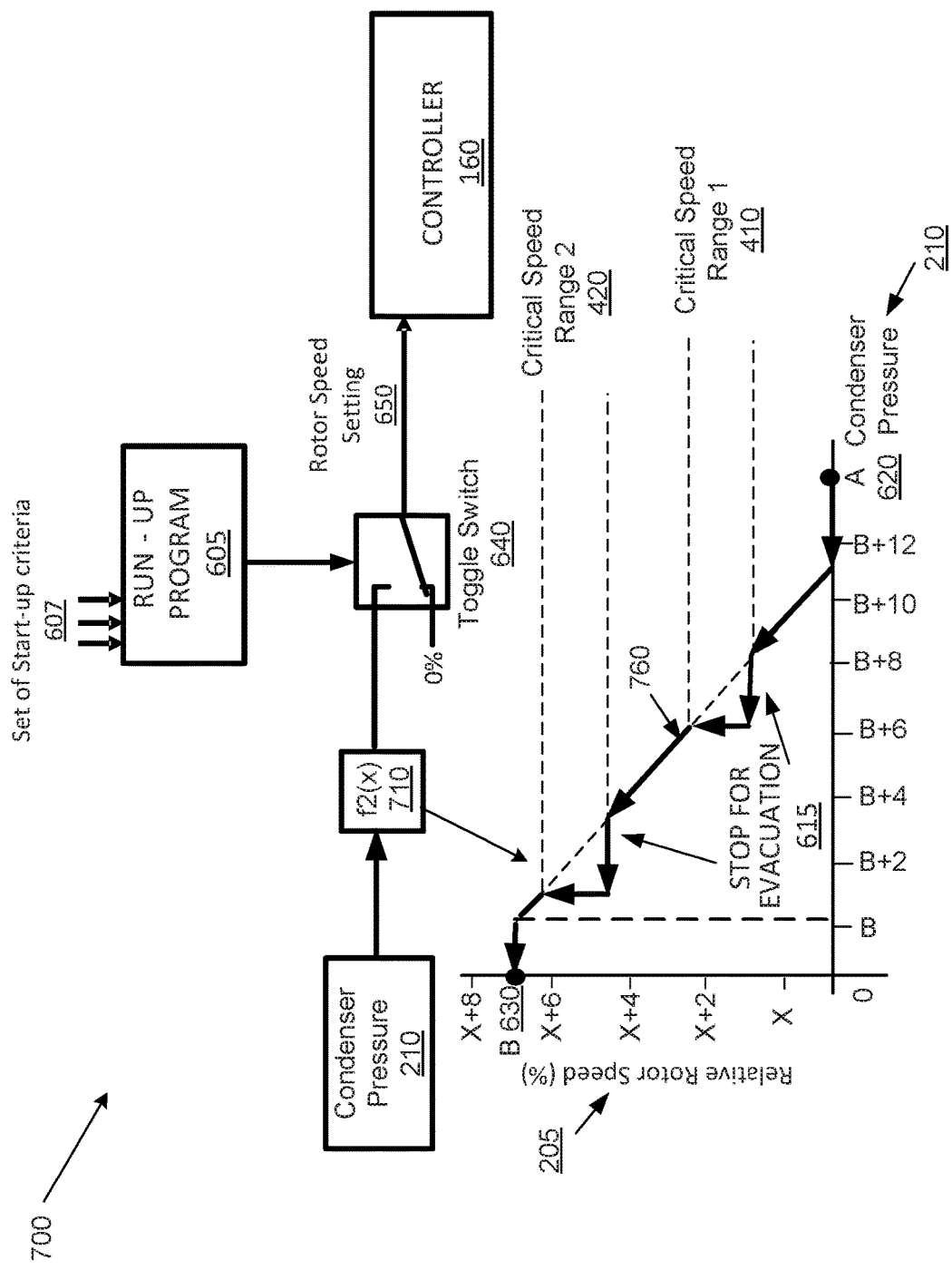

FIG. 7 depicts an example control logic diagram illustrating another example environment in which certain systems and methods to control power plant operation via control of turbine run-up and acceleration can be implemented, according to an example embodiment of the disclosure.

Figure 8:
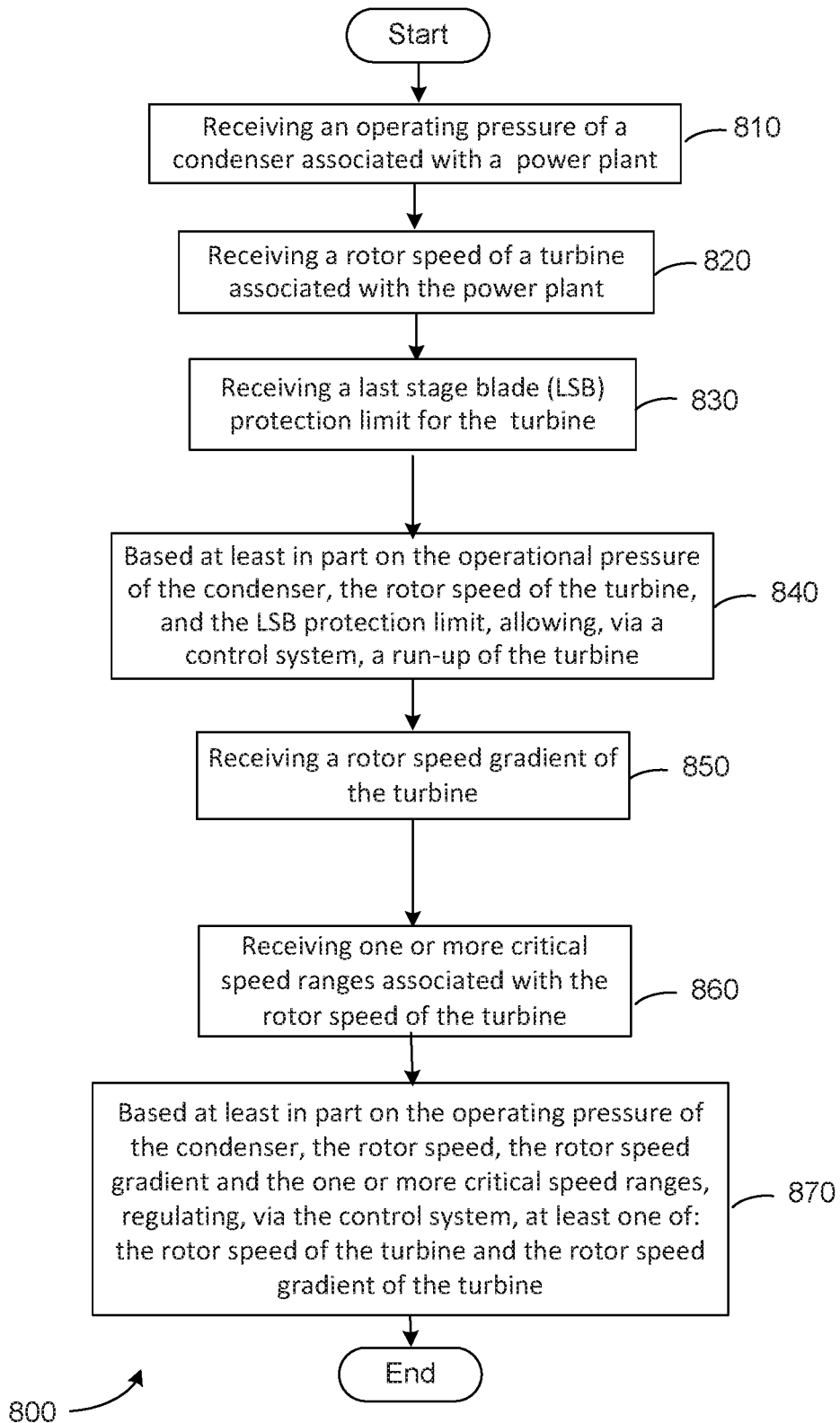

FIG. 8 is a flow chart illustrating a method to control power plant operation via control of turbine run-up and acceleration, according to an example embodiment of the disclosure.

Figure 9:
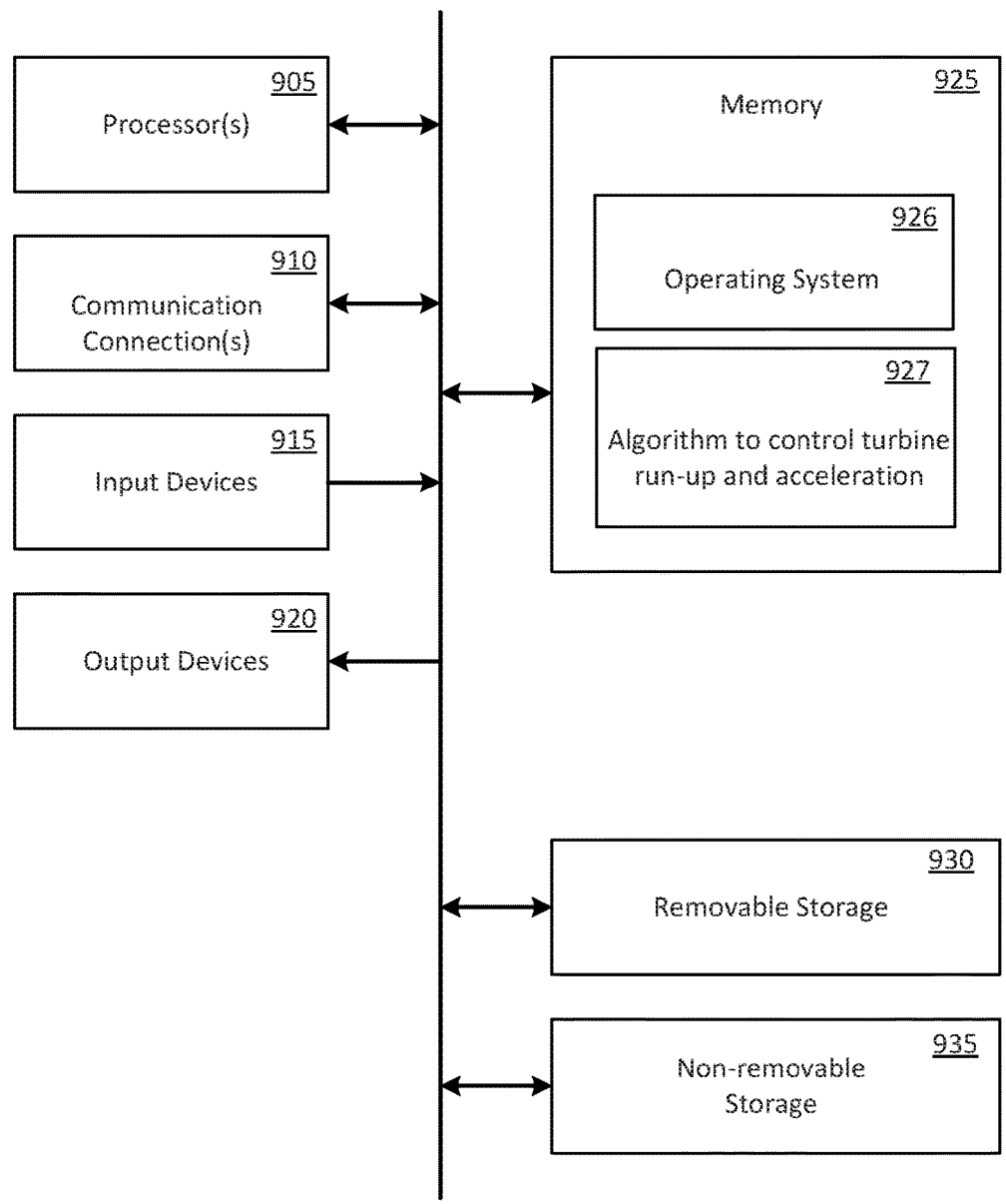

FIG. 9 is an example controller in which certain systems and methods to control power plant operation via control of turbine run-up and acceleration can be implemented, according to an example embodiment of the disclosure.

DETAILED DESCRIPTION

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents. Like numbers refer to like elements throughout.

Certain embodiments described herein relate to systems and methods to control power plant operation via control of turbine run-up and acceleration. For example, as will be described in greater detail herein, an operating pressure of a condenser associated with a power plant can be received. Also, a rotor speed of a turbine associated with the power plant may be received. Furthermore, a last stage blade (LSB) protection limit for the turbine can be received. Based at least in part on the operational pressure of the condenser, the rotor speed of the turbine, and the LSB protection limit, a run-up of the turbine may be allowed via a control system. Furthermore, a rotor speed gradient of the turbine may be received. Also, one or more critical speed ranges associated with the rotor speed of the turbine may be received. Based at least in part on the operational pressure of the condenser, the rotor speed, the rotor speed gradient, and the one or more critical speed ranges, at least one of: the rotor speed of the turbine and the rotor speed gradient of the turbine may be regulated via the control system.

One or more technical effects associated with certain embodiments herein may include, but are not limited to, a decrease in startup time of a power plant or a turbine associated with the power plant. Shorter startups enable higher operational flexibility and help a customer meet grid demands, lower startup fuel consumption and lower startup emissions. The words "startup" and "run-up" are used interchangeably throughout the application and can be considered to be synonymous terms. The following provides a detailed description of various example embodiments related to systems and methods to control power plant operation via control of turbine run-up and acceleration.

FIG. 1 depicts an example system 100 to implement certain systems and methods to control operation of a power plant 105 via control of run-up and acceleration of a turbine 120. According to an example embodiment of the disclosure, the system 100 may include a power plant 105 that may include one or more turbines 105 that can produce power, a controller 160 that can control the power plant 105 and/or the turbine 120, a condenser 140 that can receive steam exhausted from the turbine 120 and a grid 150 that can receive and transmit power from a turbine generator 130. The turbine 120 can be a steam turbine that expands high energy steam received from, for example, a boiler or a heat recovery steam generator (HRSG). During a startup of the power plant 105, design of a steam turbine last stage blade (LSB) can restrict operation of the steam turbine until an operating pressure of the condenser 140 has decayed below a condenser pressure limit. The condenser pressure limit can vary as a function of at least a turbine rotor speed. By way of an example, operating the turbine 120 at a higher rotor speed may require the condenser 140 to operate at a lower operating pressure. During the startup of the power plant 105, the operating pressure of the condenser 140 can be brought to acceptable levels using a condenser evacuation process. The condenser evacuation process can include several methods, such as, for example, a vacuum pump process, a steam jet air ejector (SJAE) process, and so on.

The controller 160 can be in communication with the turbine 120 and/or the power plant 105. The controller 160 can also receive input from power plant operators. Furthermore, the controller 160 can receive operational data from the power plant components, such as, for example, pressure data, speed data and operational limit data.

According to an embodiment of the disclosure, the controller 160 can include memory with computer-readable instructions that can receive an operating pressure of the condenser 140 associated with the power plant 105 and a rotor speed of the turbine 120. The controller 160 can further receive a last stage blade (LSB) protection limit for the turbine 120. The LSB protection limit may be in the form of a plot or in the form of a table defining condenser pressure as a function of the rotor speed of the turbine 120. Based at least in part on the operating pressure of the condenser 140, the rotor speed of the turbine, and the LSB protection limit, the controller 160 may allow a run-up (or startup) of the turbine 120.

The controller 160 can additionally receive a rotor speed gradient associated with the run-up of the turbine 120. The rotor speed gradient of the turbine 120 may be indicative of an acceleration of the turbine 120. The controller 160 may also receive one or more critical speed ranges associated with the rotor speed of the turbine 120. Critical speed ranges associated with the rotor speed of the turbine 120 can be indicative of rotor speeds at which natural frequencies of the rotor can equal the operating rotor speed. There may be one or more critical speed ranges associated with the turbine 120. Steady state operation of the turbine 120 in any critical speed range may be prohibited to avoid noise and vibrations that may cause damage to the turbine 120.

The computer-readable instructions associated with the controller 160 may further include instructions to regulate at least one of: the rotor speed of the turbine 120 and the rotor speed gradient of the turbine 120, based at least in part on the operating pressure of the condenser 140, the rotor speed, the rotor speed gradient, and the one or more critical speed ranges.

Attention is now drawn to FIG. 2, which depicts an example LSB protection limit curve 200 in accordance with an example embodiment of systems and methods to control power plant operation via control of turbine run-up and acceleration. As shown in FIG. 2, the LSB protection limit curve can depict condenser pressure 210 as a function of relative rotor speed 205 in percentage. The condenser pressure 210 may be in units of kilo Pascals (kPa) as depicted in FIG. 2 or in any other units of pressure. The LSB protection limit 230 separates an allowed region of operation 215 from a forbidden region 220 based at least in part on operating pressure of the condenser 140 (condenser pressure 210) and the rotor speed of the turbine 120 (represented as relative rotor speed 205). By way of an example, a steam turbine run-up may be allowed to proceed (increase from relative rotor speed 205 of 0%) if the corresponding condenser pressure 210 is below a turbine starting pressure B1 240 so that the condenser pressure 210 may be in the allowed region of operation. By way of another example, operation of turbine 120 at a rotor speed of A2 260 may be allowed if the condenser pressure is below B2 250. During operation, if the condenser pressure is above B2 250 when the rotor speed 205 approaches A2 260, the controller 160 may regulate the turbine 120 to hold at a rotor speed below A2 260 until the condenser pressure can be reduced to stay in the allowed region of operation 215.

Referring again to FIG. 2, the example LSB protection limit curve 200 that shows an example LSB protection limit 230 may indicate a polynomial function of condenser pressure 210 and relative rotor speed 205 that can be of any order, for example, a first order polynomial, a second order polynomial, a third order polynomial, and so on. In other embodiments, LSB protection limits may be depicted in the form of one or more look-up tables or in the form of discrete values input by an operator.

Attention is now drawn to FIG. 3, where an example condenser evacuation curve can be depicted in accordance with an example embodiment of systems and methods to control power plant operation via control of turbine run-up and acceleration. The operating pressure of the condenser, as represented by condenser pressure 210 of FIG. 2, can be based at least in part on the condenser evacuation curve. As shown in FIG. 3, the condenser evacuation curve can be a function of the operation pressure of the condenser (condenser pressure 210) and a condenser evacuation time (represented by time 310 in minutes). The condenser evacuation curve represents a capability of the condenser evacuation process that can use, for example, a vacuum pump or a steam jet air ejector. By way of an operational example of using the condenser evacuation curve 300, the turbine 120 starting pressure B1 240 can be overlaid on the condenser evacuation curve 300. Once the condenser evacuation process brings the condenser pressure 210 below the turbine starting pressure B1 240, the turbine 120 can be allowed to proceed on its run-up, in accordance with the LSB protection limit curve 200 of FIG. 2.

Referring again to the condenser evacuation curve 300 of FIG. 3, it can be appreciated that the turbine 120 acceleration from zero speed to full speed, as represented by the relative rotor speed 205 of FIG. 2, can occur simultaneously with the condenser evacuation process. It can be appreciated that the condenser evacuation process can occur independent of the turbine rotor speed. Conversely, the turbine rotor speed can depend on the condenser pressure 210 determined by the condenser evacuation process, based at least on the LSB protection limit 230 of FIG. A run-up time of the turbine 120 from zero speed to full speed can be longer than or equal to the condenser evacuation time, as represented by time 310 of FIG. 3. For instance, a time between an initiation of turbine run-up at the condenser pressure of B1 240 and turbine rotor speed of A2 260 of FIG. 2 corresponding to the condenser pressure of B2 250 can be represented by ΔT1 320. If the condenser evacuation cannot bring the condenser pressure below the condenser pressure B2 250 corresponding to the turbine rotor speed of A2 260, the turbine 120 must hold for the condenser evacuation process to bring the condenser pressure below B2 250.

Referring now to FIG. 4, an example LSB protection limit curve with critical speed ranges 400 is depicted, in accordance with an example embodiment of systems and methods to control power plant operation via control of turbine run-up and acceleration. The LSB protection limit curve with critical speed ranges 400 can be identical to the LSB protection limit curve 200 with the exception of superimposed critical speed ranges, such as, critical speed range 1 410 and critical speed range 2 420, as indicated in FIG. 4. As desired, embodiments of the disclosure may include more or fewer critical speed ranges than are illustrated in FIG. 4, and FIG. 4 depicts two speed ranges by way of example only.

Referring again to FIG. 4, each critical speed range can be bound by a lower speed limit, such as, for example, lower speed limit 1 430 of critical speed range 1 410, and by a higher speed limit, such as, for example, higher speed limit 1 440 of critical speed range 1 410. Similarly, critical speed range 2 420 can be bound by lower speed limit 2 450 and higher speed limit 2 460 as depicted in FIG. 2. Critical speed range 1 410 and critical speed range 2 420 can indicate areas in the LSB protection limit curve where unrestricted pass-through is required. This can mean that, for example, the rotor speed, as represented by the relative rotor speed 205, cannot be between the lower speed limit 1 430 and higher speed limit 1 440, when the condenser pressure 210 can be above a condenser pressure corresponding to the lower speed limit 430, since that can necessitate an operational hold to allow the condenser pressure to drop into the allowed region of operation 215. The controller 160 can restrict operational holds in a critical speed range.

Figures 5A, 5B:
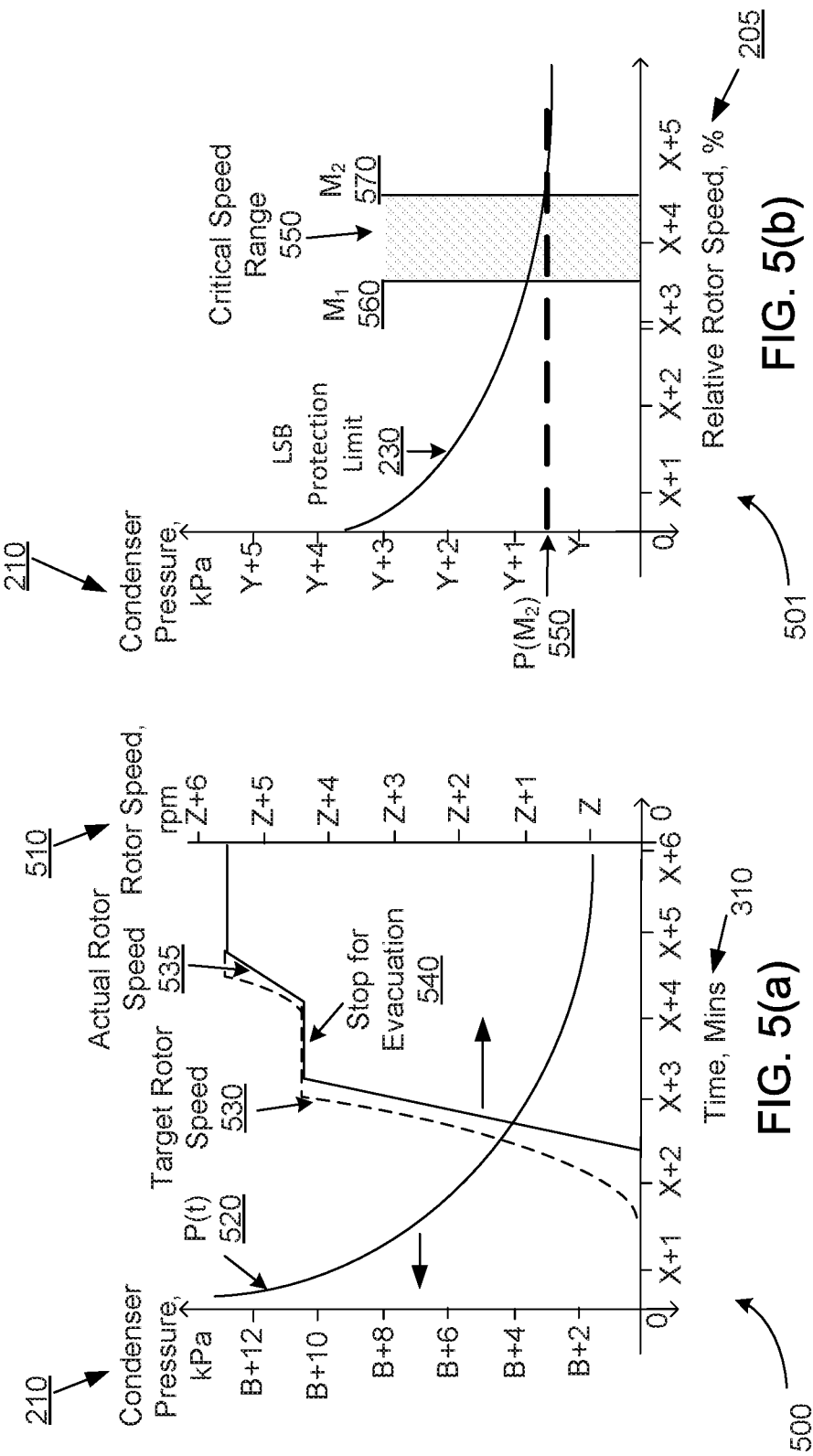

Attention is now drawn to FIG. 5 (a) and FIG. 5 (b) which respectively depict an example condenser evacuation curve 500 and an example LSB protection curve 501, in accordance with an example embodiment of systems and methods to control power plant operation via control of turbine run-up and acceleration. Superimposed on the condenser evacuation curve 500 of FIG. 5 (a) are curves representing a target rotor speed 530 and an actual rotor speed 535 of the turbine 120, represented on the second y-axis by Rotor speed 510. Rotor speed 510 may be represented in any units of rotor speed. Rotor speed 510 presented in units of rpm in FIG. 5(a) is by way of an example representation. Similarly, the LSB protection curve 501 of FIG. 5 (b) can be overlaid by a critical speed range 550 with a lower speed limit $M_1$ 560 and a higher speed limit $M_2$ 570.

Referring again to FIG. 5 (a), P(t) 520 can represent the operating pressure of the condenser 140 as a function of time in minutes 310. The x-axis of the curve in FIG. 5 (a) can be represented in units of minutes by way of an example only. The target rotor speed curve 530 and actual rotor speed curve 535 can represent rotor speed from zero speed to full speed. The target rotor speed curve 530 can be representative of an ideal target time for the rotor to accelerate from zero speed to full speed. The ideal target time can be based on a relationship of the condenser evacuation process with the turbine rotor speed. As depicted in FIG. 5 (a), the condenser evacuation process, represented by the example condenser evacuation curve 500, can cause the condenser pressure to drop from a higher value at time zero to a lower valve at time x+6 on the time axis 310. Based on the operating pressure of the condenser 140 as represented by the LSB protection limit curve 230 of FIG. 5 (b), actual rotor speed 535 can start increasing from its zero speed towards a full speed value. The slope of actual rotor speed 535 can be determined at least in part on the LSB protection limit and the critical speed ranges, such as the example critical speed range 550 of FIG. 5 (b). During the run-up of the turbine 120, when the actual rotor speed 535 can become equal to the lower speed limit M1 560 of the critical speed range 550 and the condenser pressure 210 can still be above a value corresponding to the higher speed limit M2 570 of the critical speed range 550, the controller 160 can perform actions to regulate rotor speed and rotor speed gradient of the turbine 120, as represented by the actual rotor speed 535. It can be appreciated that the controller 160 can regulate turbine speed at all times. The actions to regulate rotor speed and rotor speed gradient may include reducing actual rotor speed 535. FIG. 5 (a) shows the actions to regulate rotor speed as operational holds, such as a stop for evacuation 540, or in the form of slope changes in the actual rotor speed curve 535.

It can be appreciated from FIGS. 5 (a) and 5 (b) that the target rotor speed, as represented by target rotor speed curve 530 can be continuously correlated with the LSB protection limit 230 as the condenser evacuation process represented by P (t) 520 brings the condenser pressure 210 to acceptable levels for operation.

Referring again to FIG. 5 (a) and FIG. 5 (b), a conditional equation representing regulation of the rotor speed and the rotor speed gradient can be defined as:

$$\{[\text{Speed}(t) \geq M_1] \text{ and not}[P(t) \leq P(M_2)]\} = \text{TRUE: hold target speed at } M1$$

$$\{[\text{Speed}(t) \geq M_1] \text{ and not}[P(t) \leq P(M_2)]\} = \text{FALSE: target speed from } f(x)$$

Referring now to FIG. 6, a control system diagram 600 depicts an example control logic implementation of systems and methods to control power plant operation via control of turbine run-up and acceleration. A run-up program 605 can initiate the run-up of the turbine 120. The run-up program 605 can release the rotor speed setting 650, based on a variety of factors, including a set of start-up criteria 607, which can include, a rotor stress calculation, a rotor temperature, and so on. In addition, the run-up program can activate a toggle switch 640 based on the conditional equation described above to regulate the rotor speed and the rotor speed gradient of the turbine 120. The condenser pressure 210 can be input to a function $f1(x)$ 610 that can represent the relative rotor speed 205 as a function of the condenser pressure 210 on an example LSB protection limit curve 660 with condenser pressure 210 on the x-axis and the relative rotor speed 205 on the y-axis. Points A 620 and B 630 may represent a start and an end point respectively during a run-up of the turbine 120. The example LSB protection limit curve 660 of FIG. 6 can be represented as a linear curve. In other embodiments, the LSB protection limit curve 660 may be a polynomial of first order, second order, third order, and so on.

Referring again to FIG. 6, condenser pressure 210 can be used to regulate the run-up of the turbine 120 by the process to stop for evacuation 615 based on the conditional equation defined in section [0034]. The control logic implementation represented by FIG. 6 can perform real-time comparison of actual rotor speed, condenser pressure 210, LSB limits, as represented by LSB protection limit curve 660, and critical speed range bounds and determine regulation of the run-up process. The run-up process can be slowed or stopped if the condenser pressure 210 on the condenser evacuation curve does not decay at a rate consistent with a quick passage through a critical speed range. Parameters 625 of FIG. 6 can contain a set of intersection coordinates between the LSB protection limit curve 660 and upper speed limit and lower speed limit bounds of a critical speed range. Parameters 625 can determine when to activate the stop for evacuation 615 block. In an operational example of the condenser evacuation process depicted by the curve 660 of FIG. 6, a target rotor speed setting 650 can travel from point A 620 to point B 620 by climbing the slope of curve 660. During this operation, the control logic implementation of FIG. 6 can determine a go/stop command 617 based on the conditional equation of section [0034].

FIG. 7 depicts a control system diagram 700 for another example control logic implementation of systems and methods to control power plant operation via control of turbine run-up and acceleration. The control logic implementation represented by FIG. 7 is similar to that depicted in FIG. 6, except for a new function $f2(x)$ 710 where an example modified LSB protection curve 760 incorporates impact of critical speed range 1 410 and critical speed range 2 420, so that the curve 760 can include example rotor speed holds (represented as stop for evacuation 615 in FIG. 7) for the condenser pressure 210 to drop below the higher speed limits of respective critical speed ranges, according to the conditional equation of section [0034]. The new function $f2(x)$ can incorporate functionality associated with the stop for evacuation 615 module as well as the parameters 625 module of FIG. 6.

Referring now to FIG. 8, a flow diagram of an example method 800 to control power plant operation via control of turbine run-up and acceleration is shown, according to an example embodiment of the disclosure. The method 800 may be utilized in association with various systems, such as the system 100 illustrated in FIG. 1, the control system 600 illustrated in FIG. 6, and/or the system 700 illustrated in FIG. 7.

The method 800 may begin at block 810. At block 810, an operating pressure of a condenser 140 associated with a power plant 105 may be received. Next, at block 820, the method 800 may include receiving a rotor speed of a turbine 120 associated with the power plant 105. At block 830, the method 800 may further include receiving a last stage blade (LSB) protection limit for the turbine 120. Next at block 840, the method 800 may further include allowing, via a control system, such as the controller 160 of FIG. 1, a run-up of the turbine 120, based at least in part on the operation pressure of the condenser 140, the rotor speed of the turbine 120, and the LSB protection limit. At block 850, the method may include receiving a rotor speed gradient of the turbine 120. At block 860, the method 800 may include receiving one or more critical speed ranges associated with the rotor speed of the turbine 120. Further, at block 870, the method 800 may include regulating, via the control system, at least one of: the rotor speed of the turbine 120 and the rotor speed gradient of the turbine 120, based at least in part on the operating pressure of the condenser, the rotor speed, the rotor speed gradient, and the one or more critical speed ranges.

Attention is now drawn to FIG. 9, which illustrates an example controller 160 configured for implementing certain systems and methods to control power plant operation via control of turbine run-up and acceleration, in accordance with certain embodiments of the disclosure. The controller can include a processor 905 for executing certain operational aspects associated with implementing certain systems and methods to control power plant operation via control of turbine run-up and acceleration in accordance with certain embodiments of the disclosure. The processor 905 can be capable of communicating with a memory 925. The processor 905 can be implemented and operated using appropriate hardware, software, firmware, or combinations thereof.

Software or firmware implementations can include computer-executable or machine-executable instructions written in any suitable programming language to perform the various functions described. In one embodiment, instructions associated with a function block language can be stored in the memory 925 and executed by the processor 905.

The memory 925 can be used to store program instructions that are loadable and executable by the processor 905 as well as to store data generated during the execution of these programs. Depending on the configuration and type of the controller 160, the memory 925 can be volatile (such as random access memory (RAM)) and/or non-volatile (such as read-only memory (ROM), flash memory, etc.). In some embodiments, the memory devices can also include additional removable storage 930 and/or non-removable storage 935 including, but not limited to, magnetic storage, optical disks, and/or tape storage. The disk drives and their associated computer-readable media can provide non-volatile storage of computer-readable instructions, data structures, program modules, and other data for the devices. In some implementations, the memory 925 can include multiple different types of memory, such as static random access memory (SRAM), dynamic random access memory (DRAM), or ROM.

The memory 925, the removable storage 930, and the non-removable storage 935 are all examples of computer-readable storage media. For example, computer-readable storage media can include volatile and non-volatile, removable and non-removable media implemented in any method or technology for storage of information such as computer-readable instructions, data structures, program modules or other data. Additional types of computer storage media that can be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of computer-readable media.

Controller 160 can also include one or more communication connections 910 that can allow a control device (not shown) to communicate with devices or equipment capable of communicating with the controller 160. The controller can also include a computer system (not shown). Connections can also be established via various data communication channels or ports, such as USB or COM ports to receive cables connecting the controller 160 to various other devices on a network. In one embodiment, the controller 160 can include Ethernet drivers that enable the controller 160 to communicate with other devices on the network. According to various embodiments, communication connections 910 can be established via a wired and/or wireless connection on the network.

The controller 160 can also include one or more input devices 915, such as a keyboard, mouse, pen, voice input device, gesture input device, and/or touch input device. It can further include one or more output devices 920, such as a display, printer, and/or speakers.

In other embodiments, however, computer-readable communication media can include computer-readable instructions, program modules, or other data transmitted within a data signal, such as a carrier wave, or other transmission. As used herein, however, computer-readable storage media do not include computer-readable communication media.

Turning to the contents of the memory 925, the memory 925 can include, but is not limited to, an operating system (OS) 926 and one or more application programs or services for implementing the features and aspects disclosed herein. Such applications or services can include a module to control turbine run-up and acceleration 927 for executing certain systems and methods to control power plant operation via control of turbine run-up and acceleration. The module to control turbine run-up and acceleration 927 can reside in the memory 925 or can be independent of the controller 160. In one embodiment, the module to control turbine run-up and acceleration 927 can be implemented by software that can be provided in configurable control block language and can be stored in non-volatile memory. When executed by the processor 905, the module to control turbine run-up and acceleration 927 can implement the various functionalities and features associated with the controller 160 described in this disclosure.

As desired, embodiments of the disclosure may include a controller 160 with more or fewer components than are illustrated in FIG. 9. Additionally, certain components of the controller 160 may be combined in various embodiments of the disclosure. The controller 160 of FIG. 9 is provided by way of example only.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a non-transitory computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide task, acts, actions, or operations for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks may be performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above.

Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The claimed disclosure is:

1. A method of controlling a turbine, the method comprising:
   receiving an operating pressure of a condenser associated with a power plant;
   receiving a rotor speed of a turbine associated with the power plant;
   receiving a last stage blade (LSB) protection limit for the turbine;
   based at least in part on the operating pressure of the condenser, the rotor speed of the turbine, and the LSB protection limit, initiating, via a control system, a run-up of the turbine;
   receiving a rotor speed gradient of the turbine;
   receiving one or more critical speed ranges associated with the rotor speed of the turbine; and
   based at least in part on the operating pressure of the condenser, the rotor speed, the rotor speed gradient, and the one or more critical speed ranges, regulating, via the control system, at least one of: the rotor speed of the turbine and the rotor speed gradient of the turbine.

2. The method of claim 1, wherein the LSB protection limit is a function of the operating pressure of the condenser and the rotor speed of the turbine.

3. The method of claim 1, wherein the LSB protection limit separates an allowed region of operation from a forbidden region of operation based at least in part on the operating pressure of the condenser and the rotor speed of the turbine.

4. The method of claim 3, wherein initiating, via the control system, the run-up of the turbine comprises:
   correlating the operating pressure of the condenser to the LSB protection limit; and
   if the operating pressure of the condenser is in the allowed region of operation corresponding to the LSB protection limit, initiating the run-up of the turbine.

5. The method of claim 1, wherein the operating pressure of the condenser is based at least in part on a condenser evacuation curve, wherein the condenser evacuation curve is a function of the operating pressure of the condenser and a condenser evacuation time.

6. The method of claim 5, wherein regulating, via the control system, at least one of: the rotor speed of the turbine and the rotor speed gradient of the turbine comprises:
   correlating the rotor speed of the turbine to the operating pressure of the condenser based at least in part on the LSB protection limit;
   comparing the rotor speed of the turbine to a lower speed limit of a critical speed range of the one or more critical speed ranges; and
   if the rotor speed of the turbine is equal to or higher than the lower speed limit of the critical speed range and the operating pressure of the condenser corresponding to the condenser evacuation curve is higher than a condenser pressure corresponding to a higher speed limit of the critical speed range, implementing at least one of: reducing the rotor speed of the turbine and reducing the rotor speed gradient of the turbine.

7. The method of claim 1, wherein the one or more critical speed ranges are bound by a lower speed limit and a higher speed limit.

8. A system comprising:
   a power plant;
   a turbine associated with the power plant;
   a controller in communication with the turbine, and including a memory with computer-readable instructions configured to:
      receive an operating pressure of a condenser associated with the power plant;
      receive a rotor speed of the turbine;
      receive a last stage blade (LSB) protection limit for the turbine;
      based at least in part on the operating pressure of the condenser, the rotor speed of the turbine, and the LSB protection limit, initiate a run-up of the turbine;
      receive a rotor speed gradient of the turbine;
      receive one or more critical speed ranges associated with the rotor speed of the turbine; and
      based at least in part on the operating pressure of the condenser, the rotor speed, the rotor speed gradient, and the one or more critical speed ranges, regulate at least one of: the rotor speed of the turbine and the rotor speed gradient of the turbine.

9. The system of claim 8, wherein the LSB protection limit is a function of the operating pressure of the condenser and the rotor speed of the turbine.

10. The system of claim 8, wherein the LSB protection limit separates an allowed region of operation from a forbidden region of operation based at least in part on the operating pressure of the condenser and the rotor speed of the turbine.

11. The system of claim 10, wherein the computer-readable instructions configured to initiate the run-up of the turbine are further configured to:
   correlate the operating pressure of the condenser to the LSB protection limit; and
   if the operating pressure of the condenser is in the allowed region of operation corresponding to the LSB protection limit, initiate the run-up of the turbine.

12. The system of claim 8, wherein the operating pressure of the condenser is based at least in part on a condenser evacuation curve, wherein the condenser evacuation curve is a function of the operating pressure of the condenser and a condenser evacuation time.

13. The system of claim 12, wherein the computer-readable instructions configured to regulate at least one of: the rotor speed of the turbine and the rotor speed gradient of the turbine are further configured to:
   correlate the rotor speed of the turbine to the operating pressure of the condenser based at least in part on the LSB protection limit;

compare the rotor speed of the turbine to a lower speed limit of a critical speed range of the one or more critical speed ranges; and if the rotor speed of the turbine is equal to or higher than the lower speed limit and the operating pressure of the condenser corresponding to the condenser evacuation curve is higher than a condenser pressure corresponding to a higher speed limit of the critical speed range, implement at least one of: reduce the rotor speed of the turbine and reduce the rotor speed gradient of the turbine.

14. The system of claim 8, wherein the one or more critical speed ranges are bound by a lower speed limit and a higher speed limit.

15. A non-transitory computer-readable medium having instructions executable by a computer for performing operations comprising:

receiving an operating pressure of a condenser associated with a power plant;

receiving a rotor speed of a turbine associated with the power plant;

receiving a last stage blade (LSB) protection limit for the turbine;

based at least in part on the operating pressure of the condenser, the rotor speed of the turbine, and the LSB protection limit, initiating, via a control system, a run-up of the turbine;

receiving a rotor speed gradient of the turbine;

receiving one or more critical speed ranges associated with the rotor speed of the turbine; and based at least in part on the operating pressure of the condenser, the rotor speed, the rotor speed gradient, and the one or more critical speed ranges, regulating, via the control system, at least one of: the rotor speed of the turbine and the rotor speed gradient of the turbine.

16. The computer-readable medium of claim 15, wherein the LSB protection limit separates an allowed region of operation from a forbidden region of operation based at least in part on the operating pressure of the condenser and the rotor speed of the turbine.

17. The computer-readable medium of claim 16, wherein initiating, via the control system, the run-up of the turbine comprises:

correlating the operating pressure of the condenser to the LSB protection limit; and if the operating pressure of the condenser is in the allowed region of operation corresponding to the LSB protection limit, initiating the run-up of the turbine.

18. The computer-readable medium of claim 15, wherein the operating pressure of the condenser is based at least in part on a condenser evacuation curve, wherein the condenser evacuation curve is a function of the operating pressure of the condenser and a condenser evacuation time.

19. The computer-readable medium of claim 18, wherein regulating, via the control system, at least one of: the rotor speed of the turbine and the rotor speed gradient of the turbine comprises:

correlating the rotor speed of the turbine to the operating pressure of the condenser based at least in part on the LSB protection limit;

comparing the rotor speed of the turbine to a lower speed limit of a critical speed range of the one or more critical speed ranges; and if the rotor speed of the turbine is equal to or higher than the lower speed limit and the operating pressure of the condenser corresponding to the condenser evacuation curve is higher than a condenser pressure corresponding to a higher speed limit of the critical speed range, implementing at least one of: reducing the rotor speed of the turbine and reducing the rotor speed gradient of the turbine.

20. The computer-readable medium of claim 15, wherein the one or more critical speed ranges are bound by a lower speed limit and a higher speed limit.

* * * * *